(12) United States Patent
Vulpetti

(10) Patent No.: US 12,516,714 B2
(45) Date of Patent: Jan. 6, 2026

(54) BELT PULLER AND METHOD FOR PULLING BELT ENDS TOGETHER

(71) Applicant: Laitram, L.L.C., Harahan, LA (US)

(72) Inventor: Matthew Vulpetti, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 267 days.

(21) Appl. No.: 18/266,991

(22) PCT Filed: Dec. 22, 2021

(86) PCT No.: PCT/US2021/064804
§ 371 (c)(1),
(2) Date: Jun. 13, 2023

(87) PCT Pub. No.: WO2022/159231
PCT Pub. Date: Jul. 28, 2022

(65) Prior Publication Data
US 2024/0060545 A1    Feb. 22, 2024

Related U.S. Application Data

(60) Provisional application No. 63/139,070, filed on Jan. 19, 2021.

(51) Int. Cl.
| *F16G 3/00* | (2006.01) |
| *B25B 25/00* | (2006.01) |
| *F16G 3/02* | (2006.01) |
| *B65G 17/08* | (2006.01) |

(52) U.S. Cl.
CPC .............. *F16G 3/006* (2013.01); *B25B 25/00* (2013.01); *F16G 3/02* (2013.01); *B65G 17/08* (2013.01)

(58) Field of Classification Search
CPC ........... F16G 3/006; F16G 3/02; B25B 25/00; B65G 17/00; B65G 17/08
USPC ....................................... 198/844.2, 851–853
See application file for complete search history.

(56) References Cited

U.S. PATENT DOCUMENTS

| 457,012 A | 8/1891 | Roberts |
| 1,389,760 A | 9/1921 | Humbert |
| 2,095,867 A * | 10/1937 | Hammer .............. B65G 17/067 198/851 |

(Continued)

FOREIGN PATENT DOCUMENTS

| FR | 630774 A | 12/1927 |
| GB | 10012 A | 1/1915 |
| GB | 1154373 A * | 6/1969 | ............... F16G 3/16 |

OTHER PUBLICATIONS

YouTube "Dorner 3200 Series Modular Belt Installation" (Year: 2017).*

(Continued)

*Primary Examiner* — Mark A Deuble
(74) *Attorney, Agent, or Firm* — James T. Cronvich

(57) ABSTRACT

A method for pulling a modular conveyor belt and a belt puller for performing the method. The belt puller has eyelets on one end that interleave with hinge elements on an end of a modular conveyor belt. A rod through the eyelets and the hinge elements connects the belt to the puller, which can then be used to pull the belt. Two ends of an unconnected belt can be pulled together by connecting a belt puller to each end, joining the belt pullers with a ratchet strap or other pulling tool, and tightening the strap to pull the ends together.

18 Claims, 2 Drawing Sheets

(56) References Cited

U.S. PATENT DOCUMENTS

| | | | |
|---|---|---|---|
| 3,574,898 A | 4/1971 | Scott et al. | |
| 3,955,810 A * | 5/1976 | Travis | B25B 5/12 269/238 |
| 4,500,127 A * | 2/1985 | Van Derlin | F16G 3/006 294/132 |
| 5,431,371 A * | 7/1995 | Daniels | B65G 15/28 254/218 |
| 5,632,701 A * | 5/1997 | Neel | F16G 3/02 474/256 |
| 5,896,981 A * | 4/1999 | Walsh | F16G 3/02 198/844.2 |
| 6,068,318 A * | 5/2000 | Freund | B25B 25/00 294/134 |
| 6,474,464 B1 | 11/2002 | Horton et al. | |
| 6,695,134 B2 * | 2/2004 | Rubino | F16G 3/04 198/844.2 |
| 7,222,729 B1 * | 5/2007 | Travis | B25B 5/145 198/844.2 |
| 8,925,716 B2 * | 1/2015 | Boucher | F16G 3/16 198/844.2 |
| 2024/0026951 A1 * | 1/2024 | Vulpetti | F16G 3/02 |

OTHER PUBLICATIONS

Office Action, European patent application No. 21848386.5, mailed Apr. 7, 2025, European Patent Office, Netherlands.

Intralox Maintenance Manual Y-Sorter, pp. 1, 2, 43, 44, 49, 50, copyright 2020, Intralox, L.L.C., Harahan, Louisiana, U.S.A.

Intralox Maintenance Manual Manual Induct + Straight Line Sorter, pp. 1, 2, 56-66, copyright 2019, Intralox, L.L.C., Harahan, Louisiana, U.S.A.

* cited by examiner

BELT PULLER AND METHOD FOR PULLING BELT ENDS TOGETHER

BACKGROUND

The invention relates to tools for pulling the ends of modular conveyor belts and methods for their use in pulling belt ends together.

Modular conveyor belts are constructed of a series of rows of belt modules linked together by hinge rods into a conveyor belt capable of articulating about the hinge rods at hinge joints between consecutive rows. A new belt is received with its opposite ends unconnected to each other. The length of belt is installed in a conveyor around drive and idle sprockets and is supported in a lower return by shoes or rollers and in an upper carryway by wear strips. During installation or maintenance the unconnected opposite ends of the belt are pulled together to close the belt so that a hinge rod can be inserted at the hinge joint between the two rows at the opposite ends of the length of belt. Once the hinge rod is inserted, the belt forms an endless belt loop.

Before the opposite ends of the belt are joined, the weight of the belt in the return tends to pull the two ends apart. Pulling those ends together by hand on the carryway is difficult—especially for long, wide, and heavy belts. Belt pullers that hook into openings through the thickness of the belts at each end and connected by ratchet straps are commonly used to pull the opposite belt ends together. But pullers that work well with belts having plenty of open area do not always work well with belts having little or no open area.

SUMMARY

One version of a belt puller comprises a puller body and a rod. The puller body has a first side and an opposite second side and a first end and an opposite second end extending laterally between the first and second sides. Aligned eyelets are spaced apart laterally along the first end. The rod has a long segment and a short segment connected by a bend segment that maintains the long segment in non-collinear relation to the short segment. The long segment is extendable through the eyelets.

One version of a belt pulling system comprises a pair of belt pullers and a pulling tool. Each of the belt pullers includes aligned eyelets spaced apart along a first end, an attachment point at an opposite second end, and a rod that can extend through the eyelets. The pulling tool is attached between the pair of belt pullers at the attachment points.

A method for pulling an open end of a modular conveyor belt comprises: (a) inserting eyelets along an end of a belt puller into gaps between consecutive hinge elements of a modular conveyor belt; (b) aligning the eyelets with apertures through the hinge elements; (c) extending a puller rod through the eyelets and the apertures through the hinge elements; and (d) drawing the belt puller away from the modular conveyor belt to pull the modular conveyor belt.

DETAILED DESCRIPTION

Figure 1:
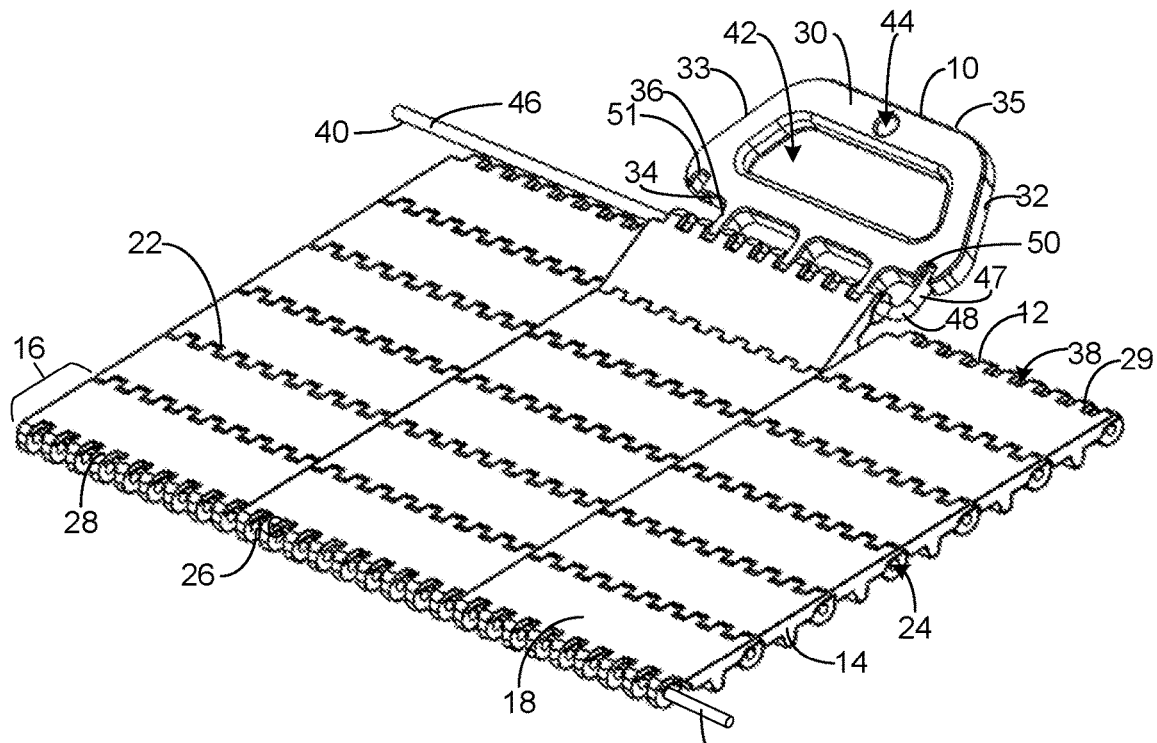
FIG. 1 is an isometric view of a section of a conveyor belt with one version of a belt puller attached.

FIG. 1 shows a belt puller 10 connected to an open end 12 of a modular conveyor belt 14 constructed of rows 16 of belt modules 18 joined by hinge rods 20 at hinge joints 22 between consecutive rows. The hinge rods 20 are received in lateral passageways 24 formed by aligned apertures 26 of interleaved hinge elements 28, 29 of consecutive rows 16. The belt puller 10 comprises a puller body 30 that has first and second opposite sides 32, 33 and first and second ends 34, 35 that extend laterally between the first and second sides. Eyelets 36 (three in this example) extend outward of and are spaced laterally apart along the first end 34.

The belt puller 10 is connected to the open end 12 of the conveyor belt 14. The puller's eyelets 36 fit into gaps 38 between laterally consecutive hinge elements 28. The eyelets 36 have a lateral width sized to fit in the gaps 38. And the eyelets 36 are positioned laterally at integral multiples of the lateral pitch of the hinge elements 28. Once the belt puller's eyelets 36 are fixed in the gaps 38, a rod 40 is inserted through the lateral passageway formed by the eyelets and the aligned apertures 26 of the hinge elements 29. The conveyor belt 14 can then be pulled by the belt puller 10 by drawing the belt puller in a direction away from the modular conveyor belt section.

The belt puller 10 shown in this example has an opening 42 in the puller body 30 between the first and second ends 34, 35 and the first and second sides 32, 33 to form a handle, which is convenient for pulling by hand. A hole 44 through the second end 35 provides an attachment point to which a ratchet strap or other pulling tool can be attached. The rod 40 shown in this illustrative version has a long segment 46 and a short segment 47 connected by a bend segment 48. The long segment 46 is used to connect the belt puller 10 to the conveyor belt 14 through its hinge elements 29. As shown in this example, the short segment 47 is disposed at an angle of 90° relative to the long segment 46, although other angles could be used. Thus, the long and short segments 46, 47 are not collinear. A notch 50 formed along the first end 34 of the puller body 30 at the first side 32 receives an end of the short segment 47 of the rod 40 to stabilize the inserted rod. A second notch 51 can also be formed along the first end 34 at the opposite second side 33 to allow the rod 40 to be inserted into the passageway from the other direction. But it should be clear that a rod without a short segment could be used with the belt puller 10. For example, a rod with a head on one end could be used. In that case, the notches 50, 51 would be unnecessary. Because the belt puller 10 uses a rod that is received in the belt's hinge elements 29, it is useful for belts having little or no open area as well as for belts with plenty of open area.

Figure 2:
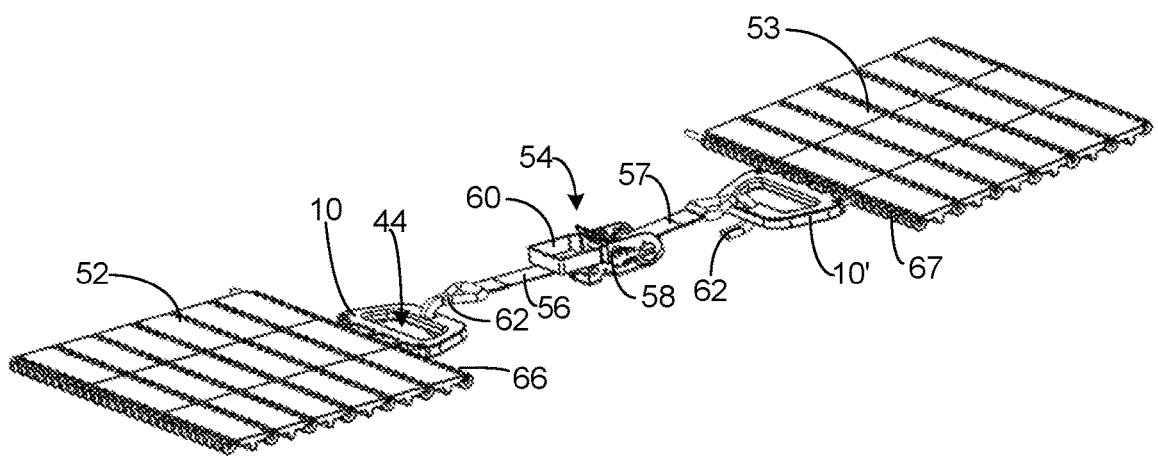
FIG. 2 is an isometric view of two belt pullers as in FIG. 1 attached to the unconnected ends of a conveyor belt as in FIG. 1 and joined by a ratchet strap.

FIG. 2 shows how two opposite open ends 66, 67 of the modular conveyor belt 14 are pulled together by a belt pulling system that includes two belt pullers 10, 10' connected by a pulling tool, such as a ratchet strap 54. The ratchet strap 54 includes a fixed length of webbing 56 attached at one end to a central ratchet mechanism 58. A free end of a second length of webbing 57 extends through the ratchet mechanism 58. A handle 60 is manually pumped to advance the second length of webbing 57 through the ratchet mechanism 58 to pull the two belt sections 52, 53 together so that they can be joined by hinge rods with the puller rods 40 are extracted. Hooks 62 at the outer ends of the webbings 56, 57 hook into the holes 44 in the pullers 10, 10'. Other pulling tools, such as come-alongs, winches, and other cable or rope systems with or without ratchets, connected between the two pullers 10, 10' can be used.

Figure 3:
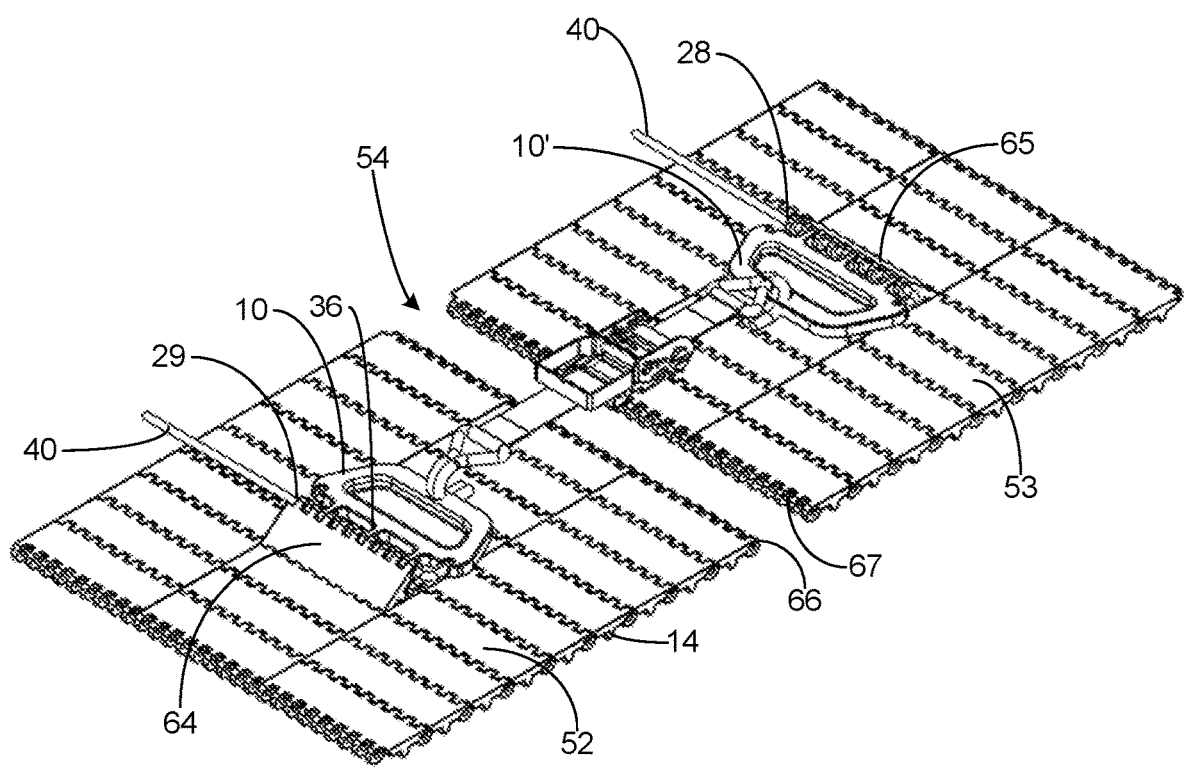
FIG. 3 is an isometric view as in FIG. 2 in which the belt pullers are connected to belt modules inward of the unconnected belt ends.

FIG. 3 shows the pullers 10, 10' connected to the hinge elements 28, 29 of belt modules 64, 65 inward of the open ends 66, 67 of the two belt sections 52, 53. After the hinge rods are withdrawn from the modules 64, 65, their ends closer to the open ends 66, 67 of the belt 14 are lifted and then connected to the belt pullers 10, 10'. The puller eyelets 36 are inserted into the gaps between the hinge elements of the lifted modules 64, 65. The eyelets 36 are aligned with the apertures through the hinge elements. Then the puller rods 40 are extended through the lateral passageway formed by the aligned apertures and eyelets. The ratchet strap 54 is hooked between the two pullers 10, 10' and tightened to draw the two open ends 66, 67 of the belt 14 toward each other so that they can be joined. Once the apertures of the interleaved hinge elements at the open ends are laterally aligned, a hinge rod is inserted in the passageway to link the two ends 66, 67 together. The puller rods 40 are then removed from the belt modules 64, 65 and the hinge rod re-inserted to form an endless belt loop.

What is claimed is:

1. A belt puller that is attachable to hinge elements of a modular conveyor belt for pulling the modular conveyor belt, the belt puller comprising:
    a puller body including:
        a first side and an opposite second side;
        a first end and an opposite second end extending laterally between the first and second sides;
        a plurality of aligned eyelets spaced apart laterally along the first end and configured to fit into gaps between hinge elements along an open end of a modular conveyor belt;
    a rod having a long segment and a short segment connected by a bend segment maintaining the long segment in non-collinear relation to the short segment;
    wherein the long segment is extendable through the hinge elements and the eyelets fitted into the gaps to attach the belt puller to the modular conveyor belt so that the modular conveyor belt can be pulled by drawing the belt puller in a direction away from the open end of the modular conveyor belt.

2. The belt puller as claimed in claim 1 wherein the puller body includes a notch along the first end at the first side to receive an end of the short segment of the rod.

3. The belt puller as claimed in claim 2 wherein the puller body includes a second notch along the first end at the second side to receive an end of the short segment of the rod.

4. The belt puller as claimed in claim 1 wherein the puller body includes a hole through the second end.

5. The belt puller as claimed in claim 1 wherein the rod is removable from the puller body.

6. A method for pulling an open end of a modular conveyor belt, comprising:
    (a) inserting eyelets along an end of a belt puller into gaps between consecutive hinge elements at an open end of a modular conveyor belt;
    (b) aligning the eyelets with apertures through the hinge elements;
    (c) extending a puller rod through the eyelets and the apertures through the hinge elements;
    (d) drawing the belt puller away from the modular conveyor belt to pull the modular conveyor belt;
    (e) performing steps (a) through (c) with a second belt puller on an opposite open end of the belt across a space between the two open ends;
    (f) attaching a pulling tool between the two belt pullers;
    (g) tightening the pulling tool to pull the two opposite open ends together;
    (h) removing the puller rod from the hinge elements;
    (i) interleaving the hinge elements of the two open ends; and
    (i) inserting a hinge rod through the interleaved hinge elements along the two open ends to close the modular conveyor belt.

7. The method as claimed in claim 6 wherein the eyelets are inserted into gaps between consecutive hinge elements along an open end of the modular conveyor belt.

8. A belt pulling system that is attachable to hinge elements of a modular conveyor belt separated at opposite ends into two opposite open ends for pulling the opposite open ends of the modular conveyor belt together, the system comprising:
    a pair of belt pullers each including:
        a first side and an opposite second side;
        a first end and an opposite second end extending laterally between the first and second sides;
        a plurality of aligned eyelets disposed and spaced apart along the first end between the first and second sides;
        an attachment point at an opposite second end devoid of eyelets;
        a rod extendable through the eyelets along the first end and through the hinge elements of a modular conveyor belt when the hinge elements are aligned with the eyelets;
    wherein the rod of a first one of the belt pullers is extendable through the eyelets and the aligned hinge elements along or inward of a first one of the opposite open ends and wherein the rod of a second one of the belt pullers is extendable through the eyelets and the aligned hinge elements along or inward of a second one of the opposite open ends;
    a pulling tool attachable between the pair of belt pullers at the attachment points to pull the opposite open ends together.

9. The belt pulling system as claimed in claim 8 wherein the attachment point is formed as a hole through the belt puller at the second end and wherein the pulling tool has hooks at opposite ends that hook into the holes.

10. The belt pulling system as claimed in claim 8 wherein the eyelets of each belt puller have a lateral width sized to fit in the spaces between consecutive hinge elements of a modular conveyor belt.

11. The belt pulling system as claimed in claim 8 wherein the rod of each belt puller is removable from the eyelets.

12. The belt pulling tool as claimed in claim 8 wherein the pulling tool is a ratchet strap or a come-along.

13. A method for pulling an open end of a modular conveyor belt, comprising:
    (a) inserting eyelets along an end of a belt puller into gaps between consecutive hinge elements at an open end of a modular conveyor belt;
    (b) aligning the eyelets with apertures through the hinge elements;
    (c) extending a puller rod through the eyelets and the apertures through the hinge elements;
    (d) drawing the belt puller away from the modular conveyor belt to pull the modular conveyor belt;
    (e) before step (a), removing a hinge rod from a hinge joint inward of the open end of the belt; and
    (f) lifting the end of a belt module at the hinge joint whose rod has been removed to make its hinge elements at that end accessible;
    (g) then performing steps (c) and (d).

14. A belt puller that is attachable to hinge elements of a modular conveyor belt for pulling the modular conveyor belt, the belt puller comprising:
- puller body including:
  - a first side and an opposite second side;
  - a first end and an opposite second end extending laterally between the first and second sides;
  - a single opening between the first and second ends and the first and second sides to form a handle;
  - a plurality of aligned eyelets spaced apart laterally along the first end and configured to fit into gaps between hinge elements of a modular conveyor belt;
- a rod;
- wherein the rod is extendable through the eyelets and the hinge elements to attach the belt puller to the modular conveyor belt so that the modular conveyor belt can be pulled by drawing the belt puller in a direction away from an open end of the modular conveyor belt.

15. The belt puller as claimed in claim 14 wherein the rod is extractable from the eyelets.

16. The belt puller as claimed in claim 14 wherein the puller body includes a hole through the second end forming an attachment point to which a belt pulling system can be attached.

17. The belt puller as claimed in claim 14 wherein the rod has a long segment and a short segment disposed at an angle of 90° relative to the long segment.

18. The belt puller as claimed in claim 17 wherein the long segment is extendable through the eyelets.

* * * * *